United States Patent [19]

Kawamoto

[11] Patent Number: 4,965,319

[45] Date of Patent: Oct. 23, 1990

[54] POLYMER COMPOSITION

[75] Inventor: Manabu Kawamoto, Chiba, Japan

[73] Assignee: Du Pont-Mitsui Polychemicals Co., Ltd., Tokyo, Japan

[21] Appl. No.: 372,384

[22] PCT Filed: Feb. 21, 1989

[86] PCT No.: PCT/JP89/00171

§ 371 Date: Jun. 2, 1989

§ 102(e) Date: Jun. 2, 1989

[87] PCT Pub. No.: WO89/07624

PCT Pub. Date: Aug. 24, 1989

[30] Foreign Application Priority Data

Feb. 22, 1988 [JP] Japan .................................. 63-37645

[51] Int. Cl.$^5$ ...................... C08L 23/26; C08L 23/16; C08L 33/02
[52] U.S. Cl. .................................. 525/194; 525/196; 525/221; 525/211; 525/193; 524/522
[58] Field of Search ........................ 525/194, 196, 221

[56] References Cited

U.S. PATENT DOCUMENTS 4,371,583 2/1983 Nelson .................................. 525/221
4,766,174 8/1988 Statz .................................... 525/196

FOREIGN PATENT DOCUMENTS 58-215437 12/1983 Japan .
61-36344 2/1986 Japan .
61-36347 2/1986 Japan .

Primary Examiner—Carman J. Seccuro
Attorney, Agent, or Firm—Wenderoth, Lind & Ponack

[57] ABSTRACT

Provided herein a polymer composition which comprises from 50 to 85 parts by weight of an ethylene-type ionomer resin (A), from 10 to 39 parts by weight of a partially crosslinked olefin-type thermoplastic elastomer (B) and from 1 to 15 parts by weight of an ethylene-alpha-olefin copolymer rubber (C). The proposed composition is excellent in scratch resistance, adhesion to metals, resistance to heat deformation, flexibility, anti-bleeding property of mineral oil softener contained and low surface gloss.

4 Claims, No Drawings

POLYMER COMPOSITION

TECHNICAL FIELD OF THE INVENTION

The present invention relates to an ionomer composition which is excellent in scratch resistance, adhesion to metals, resistance to heat deformation, flexibility, antibleeding property of mineral oil softener contained and low surface gloss.

BACKGROUND OF THE INVENTION

Because ionomer resins are lightweight and rigid, and are excellent in adhesion to metal, gloss, and scratch resistance, ionomer resins draw attention of the art as attractive resins for use in automotive exteriors. Depending upon intended uses, however, ionomer resins which are flexible and delustered are desired, while retaining their excellent adhesion to metals or scratch resistance.

In applications where scratch resistance is of paramount importance, it is necessary to use such ionomer resins that they contain increased amounts of metallic ions. The higher the metallic ion content becomes, however, ionomer resins tend to become more rigid and more lustrous. While it is desired to make flexible and delusterd ionomer resins which contain a large amount of metallic ions to become rigid and lustrous, it is not necessarily easy to do so.

For example, Japanese Patent Laid-open Publication No. 57-190034 discloses a low lustrous ionomer composition comprising about from 40 to 80 % by weight of an ionomer and about from 20 to 60 % by weight of an ethylene/propylene copolymer rubber. With the ionomer composition of this publication, if scratch resistance is sought, it is difficult to obtain a low lustrous composition, whereas low luster can only be achieved at the costs of scratch resistance or heat deformation resistance. In other words it has been difficult to provide an ionomer composition having a combination of the scratch resistance and the low luster.

Our Japanese Patent Laid-open Publication No. 61-36347 discloses a polymer composition having excellent scratch resistance and heat deformation resistance comprising an ionomer and a thermoplastic elastomer derived from olefins. With this polymer composition, again, it has been difficult to realize a combination of scratch resistance and low luster.

Further, the polymer composition of Japanese Patent Laid-open Publication No. 61-36347 involves such problems that a mineral oil softening agent contained in the thermoplastic elastomer derived from olefins, if any, bleeds up to surfaces of shaped articles made of the polymer composition, rendering the surfaces sticky or of poor appearance.

In view of these state of the art, an object of the invention is to provide an ionomer compostion which is excellent in scratch resistance, adhesion to metals, resistance to heat deformation, flexibility, antibleeding property of mineral oil softener contained and low surface gloss.

DISCLOSURE OF THE INVENTION

According to the invention there is provided a polymer composition which comprises from 50 to 85 parts by weight of an ethylene-type ionomer resin (A), from 10 to 39 parts by weight of a partially crosslinked olefin-type thermoplastic elastomer (B) and from 1 to 15 parts by weight of an ethylene/alpha-olefin copolymer rubber (C).

BEST MODE FOR CARRYING OUT THE INVENTION

The polymer composition according to the invention will now be described in detail.

The ethylene-type ionomer resin which can be used herein are prepared by neutralizing a part, normally from 5 to 90% of carboxyl groups of ethylene/alpha, beta-unsaturated unsaturated carboxylic acid copolymers (1) or ethylene/alpha, beta-unsaturated acid/alpha, beta-unsaturated acid ester copolymers (2) with metallic ion.

Preferred ethylene/alpha, beta-unsaturated carboxylic acid copolymers (1) and ethylene/alpha, beta-unsaturated acid/alpha, beta-unsaturated acid ester copolymers (2) comprise normally from 75 to 99.5 mol % preferably from 88 to 98 mol % of ethylene units; normally from 0.5 to 15 mol % preferably from 1 to 6 mol% of alpha, beta-unsaturated carboxylic acid units; and normally from 0 to 10 mol%, preferably from 0 to 6 mol % of alpha, beta-unsaturated carboxylic acid ester units. In case where the copolymers (1) or (2) contains the ethylene, alpha, beta-unsaturated carboxylic acid and alpha, beta-unsaturated carboxylic acid ester units in the above-mentioned proportions, polymer compositions according to the invention are particularly excellent in adhesion to metals and in heat resistance.

The ethylene-type ionomer resins which can be used herein are prepared by neutralizing a part, normally from 5 to 90 % of carboxyl groups of the copolymers (1) or (2) with metallic ions. This percentage will be referred to herein as a neutralization degree. A preferred neutralization degree of the ionomer resins is from 15 to 90 % in particular from 40 to 90 %.

Suitable alpha, beta-unsaturated carboxylic acids which constitute the copolymers (1) or (2) are those having from 3 to 8 carbon atoms including, for example, acrylic acid, methacrylic acid, maleic acid, fumaric acid and maleic anhydride. Of these, acrylic acid and methacrylic acid are particularly preferred. Suitable alpha, beta-unsaturated carboxylic acid esters which constitute the copolymers (2) are those having from 4 to 12 carbon atoms including, for example, methyl acrylate, methyl methacrylate, ethyl acrylate, ethyl methacrylate, isobutyl acrylate, butyl methacrylate and dimethyl fumarate. Of these, acrylate and methacrylate are particularly preferred.

Metallic ions suitable for use in the neutralization of the carboxyl groups of the copolymers (1) or (2) are those having a valency of form 1 to 3, in particular such ions of metals of the Groups I, II, III, IVA and VIII of the Periodic Table. Specifically, $Na^+$, $K^+$, $Li^+$, $Cs^+$, $Ag^+$, $Hg^+$, $Cu^+$, $Be^{++}$, $Mg^{++}$, $Ca^{++}$, $Sr^{++}$, $Ba^{++}$, $Cu^{++}$, $Cd^{++}$, $Hg^{++}$, $Sn^{++}$, $Pb^{++}$, $Fe^{++}$, $Co^{++}$, $Ni^{++}$, $Zn^{++}$, $Sc^{++}$ $Al^{+++}$, $Fe^{+++}$ and $Y^{+++}$ can be used alone or in combination. Further, a combination of metallic ions and ammonium ion may also be used. Of the metallic ions, $Zn^{++}$ and $Na^+$ are particularly preferred.

The ethylene-type ionomer resins used herein have a melt flow rate of normally from 0.1 to 1000 g/10 min., preferably from 0.1 to 30 g/10 min., and more preferably from 0.1 to 10 g/10 min, as measured in accordance with ASTM D 1238 at a temperature of 190 ° C.

The partially crosslinked olefin-type thermoplastic elastomer (B) which can be used herein preferably comprises as essential components, a partially cross-linked ethylene/alpha-olefin copolymer rubber and a polyolefin resin. This thermoplastic elastomer (B) preferably prepares by partially crosslinking a rubbery composition comprising an ethylene/alpha-olefin copolymer rubber and a polyolefin resin.

This partially crosslinked olefin-type thermoplastic elastomer (B) further contains a polyolefin resin in addition to the partially crosslinked olefin-type thermoplastic elastomer.

Preferably the thermoplastic elastomer (B) contains from 5 to 80 parts by weight, preferably from 20 to 70 parts by weight of the polyolefin resin and from 20 to 95 parts by weight, preferably from 30 to 80 parts by weight of the partially crosslinked ethylene/alpha-olefin copolymer rubber with the proviso that the sum of both the components is 100 parts by weight.

When partial crosslinking the above-mentioned rubbery composition, peroxide-noncrosslinkable hydrocarbon rubbers and/or mineral oil softeners may be added to the rubbery composition. These components are preferably be used in an amount of up to 50 % by weight, in particular from 5 to 40 % by weight, based on the total weight of the rubbery composition.

Preferred partially crosslinked olefin-type thermoplastic elastomers (B) which can be used herein comprise:

[I] from 100 to 30 parts by weight of a partially crosslinked rubber composition obtained by dynamic heat treatment of a mixture comprising:
 (a) from 20 to 95 parts by weight of an ethylene/alphaolefin copolymer rubber,
 (b) from 5 to 80 parts by weight of a polyolefin resin, the total weight of the (a) +(b) being 100 parts by weight, and
 from 5 to 80 parts by weight of components selected from
 (c) peroxide-noncrosslinkable hydrocarbon rubbers and
 (d) mineral oil softeners in the presence of a crosslinking agent, and
[II] from 0 to 70 parts by weight of a polyolefin resin, the total weight of (b) and [II]in the elastomer (B) being from 5 to 80 parts by weight based on 100 parts by weight of the elastomer (B).

By the term "dynamic heat treatment of a mixture" used herein is meant kneading the mixture in molten condition. The kneading is preferably carried out using a closed apparatus under an atmosphere of an inert gas such as nitrogen and carbon dioxide. The kneading temperature is normally from 150 to 280° C., preferably from 170 to 240 ° C., and the kneading time is normally from 1 to 20 minutes, preferably from 1 to 10 minutes.

As the ethylene/alpha-olefin copolymer rubber (a) for preparing the partially crosslinked olefin-type thermoplastic elastomer (B), use can be made of substantially amorphous or low crystalline elastomers having a crystallinity index of not higher than 20 %, preferably not higher than 10 %, derived from ethylene and alpha-olefin having from 3 to 14 carbon atoms, such as ethylene/propylene copolymer rubbers, ethylene/propylene/ nonconjugated diene terpolymer or quaternary polymer rubbers, ethylene/propylene/1-butene terpolymer rubbers. ethylene/1-butene copolymer rubbers and ethylene/1-butene/nonconjugated diene terpolymer or quaternary polymer rubbers. Of these, ethylene/propylene copolymer rubbers and ethylene/propylene/nonconjugated diene terpolymer rubbers are particularly preferred. Examples of the nonconjugated dienes include, for example, dicyclopentadienes, 1,4-hexadiene, cyclooctadiene, methylenenorbornenes and 5-ethylidene-2-norbornene. Of these, dicyclopentadienes and 5-ethylidene-2-norbornene are preferred.

The ethylene/alpha-olefin copolymer rubbers (a), including terpolymer and quaternary polymer rubbers, which can be used herein, have a Mooney viscosity [$ML_{1+4}$ (100 ° C.)]of normally from 10 to 180, preferably from 40 to 140, and preferably have an iodine value (degree of unsaturation) of not more than 16.

The ethylene/alpha-olefin copolymer rubbers (a) used herein preferably contain units derived from ethylene and alpha-olefin in such a molar ratio that ethylene units/alpha-olefin units is from 50/50 to 90/10, and more preferably from 60/40 to 84/16. When the copolymer rubbers (a) contain units derived from one or more nonconjugated dienes, in addition to units derived from ethylene and alpha-olefin, a molar ratio of units derived from 1-olefin (ethylene +alpha-olefin) to units derived from one or more nonconjugated dienes is normally 98/2 to 90/10, and preferably from 97/3 to 94/6.

As the polyolefin resin (b) which is dynamically heat treated with the ethylene/alpha-olefin copolymer (a), use can be made of homopolymers of 1-olefins such as ethylene, propylene, butene-1, hexene-1 and 4-methylpentene-1, copolymers of at least two 1-olefins and copolymers of 1-olefins and up to 15% by mole of at least one other copolymerizable monomer, such as ethylene/vinyl acetate copolymers, ethylene/acrylic acid copolymers, ethylene/methyl acrylate copolymers, ethylene/ethyl acrylate copolymers, ethylene/methacrylic acid copolymers and ethylene/methyl methacrylate copolymers. Of these, polyolefin resins having a melt flow rate of from 0.1 to 50 g/10 min., in particular from 5 to 20 g/10 min., as measured in accordance with ASTM-D-1238-65T and having a crystallinity index of at least 40 %, as measured by X-ray diffractometry, are preferred.

As the polyolefin resin (b), particularly preferred are peroxide-decomposable polyolefin resins having the abovespecified melt flow rate and crystallinity. The term "peroxide-decomposable polyolefin resins" means that the polyolefin resins undergo cleavage of polymer chains to some extent to reduce molecular weight thereof and to increase in melt flow rate, when kneaded together with a peroxide under heat. Examples of such peroxide-decomposable polyolefin resins include, for example, isotactic polypropylene and copolymers of propylene with up to 15 mol % of other alpha-olefins such as propylene/ethylene copolymers, propylene/1-butene copolymers, propylene/1-hexene copolymers and propylene/4-methyl-1-pentene copolymers.

Blends of such peroxide-decomposable polyolefin resins with peroxide crosslinkable resins such as low, medium and high density polyethylenes having a density of from 0.810 to 0.940 g/cm: may also be used as the polyolefin resin (b) in the practice of the invention. The term"peroxide crosslinkable polyolefin resins" means that the polyolefin resins undergo crosslinking of polymer chains to some extent and decrease in melt flow rate when kneaded together with a peroxide under heat.

Examples of the peroxide-noncrosslinkable hydrocarbon rubbers (c), which can be used herein, include, for example, polyisobutylene rubbers, butyl rubbers, propylene/ethylene copolymer rubbers having a propylene content of at least 70 by mole, propylene/1-butene copolymer rubbers having a propylene content of at least 70 % by mole and atactic polypropylenes. Of these, polyisobutylene and propylene/1-butene copolymer rubbers are preferred. By the term "peroxide-noncrosslinkable hydrocarbon rubbers" is meant that the hydrocarbon rubbers do not undergo crosslinking of polymer chain and do not decrease in melt flow rate even when they are kneaded in the presence of a peroxide under heat.

As the mineral oils (d), use can be made of paraffinic, naphthenic and aromatic high boiling petroleum fractions normally employed in rubber industry for a purpose of weakening intermolecular action of rubbers thereby facilitating roll processing thereof and promoting dispersion of carbon black or white carbon thereinto, or for a purpose of reducing hardness of vulcanized rubbers thereby enhancing flexibility or elasticity thereof.

Upon preparation of the partially cross-linked olefinic thermoplastic elastomer (B), the peroxide-non-cross-linkable hydrocarbon rubbers (c) and/or mineral oil softeners (d) are not necessarily be used. However, for a purpose of further improving flow properties and moldability of the polymer composition according to the invention, it is generally advantageous to incorporate (c) and/or (d) to a mixture of the ethylene/alpha-olefin copolymer rubber (a) and the polyolefin resin (b) in an amount of up to 100 parts by weight, preferably up to 80 parts by weight, in particular from 5 to 80 parts by weight based on 100 parts by weight of the combined (a) and (b), and to subject the resulting blend to the dynamic heat treatment to provide the partially crosslinked rubber composition [I].

A preferred partially crosslinked olefin-type thermoplastic elastomer (B) which can be used herein comprises from 100 to 30 parts by weight of the partially crosslinked rubber composition [I]prepared in the manner as described above and from 0 to 70 parts by weight of a polyolefin resin [II], the total weight of (b) and [II]in the elastomer (B) being from 5 to 80 parts by weight based on 100 parts by weight of the elastomer (B). As the polyolefin resin [II], which is optionally added to the partially crosslinked rubber composition [I]after the dynamic heat treatment, use can be made of those hereinbefore described with respect to the polyolefin resin (b), that is, homopolymers of 1-olefins such as ethylene, propylene, butene-1, hexene-1 and 4-methyl-pentene-1, copolymers of at least two 1-olefins and copolymers of 1-olefins and up to 15% by mole of at least one other copolymerizable monomer, such as ethylene/vinyl acetate copolymers, ethylene/acrylic acid copolymers, ethylene/methyl acrylate copolymers, ethylene/ethyl acrylate copolymers, ethylene/-methacrylic acid copolymers and ethylene/methyl methacrylate copolymers. Of these, polyolefin resins having a melt flow rate of from 5 to 100 g/10 min., in particular from 10 to 50 g/10 min., as measured in accordance with ASTM-D-1238-65T (at 190 ° C., or at 230 ° C. in the case of polymers of propylene), are preferred.

To prepare the partially crosslinked rubber composition [I], a mixture comprising from 95 to 20 parts by weight of the ethylene/alpha-olefin copolymer rubber (a), from 5 to 80 parts by weight of the polyolefin resin (b) and optionally from 5 to 80 parts by weight of the peroxide-noncrosslinkable hydrocarbon rubber (c) and-/or the mineral oil softener (d), is dynamically heat treated in the presence of from about 0.05 to 2 parts by weight, preferably from 0.1 to 0.5 part by weight of a crosslinking agent so as to partially crosslink the ethylene/alpha-olefin copolymer rubber (a).

The crosslinking agents, which can be used herein, include organic peroxides, sulfur, phenolic vulcanizing agents, oximes and polyamines. Of these, organic peroxides and phenolic vulcanizing agents are preferred in view of properties of the resulting partially crosslinked products.

Examples of the phenolic vulcanizing agents include, for example, alkylphenol-formaldehyde resins, triazine-formaldehyde resins and melamine-formaldehyde resins.

Examples of organic peroxides include, for example, dicumyl peroxide, di-tert.-butyl peroxide, 2,5-dimethyl-2,5-bis(tert.-butylperoxy)hexane, 2,3-dimethyl-2,5-bis(-tert.-butylperoxy)hexyne-3, 1,3-bis(tert.butylperoxyisopropyl)benzene, 1,1-bis(tert.-butylperoxy)3,3,5-trimethylcyclohexane, n-butyl-4,4-bis(tert.-butylperoxy)valerate, dibenzoyl peroxide and tert.-butylperoxy benzoate. Of course, bisperoxide compounds, in particular, 1,3-bis(tert.-butylperoxyisopropyl)benzene, is preferred in view of their less ill-smelling and scorch resistant properties.

Upon dynamic heat treatment of the above-mentioned mixture, incorporation to the mixture of crosslinking promoters such as p-quinonedioxime and p,p'-dibenzoylquinonedioxime or polyfunctional vinyl monomers such as divinylbenzene (DVB), diethyleneglycol methacrylate, polyethylenediglycol methacrylate and the like is preferred. By doing so more uniform and moderate crosslinking reaction can be realized. Particularly preferred is divinylbenzene (DVB), since it provides uniform crosslinking effects to obtain thermoplastic elastomers having balanced flow and mechanical properties.

The partially crosslinked thermoplastic elastomer (B) used herein may optionally contain additives, including fillers such as carbon black, clay, talc, calcium carbonate, calcium bicarbonate, diatomaceous earth, silica, alumina, asbestos, graphite and glass fibers, antioxidant such as phenyl-alpha-naphthylamine, 2,6-di-tert.-butylphenol and tetrakis[methylene(3,5-di-tert.-butyl-4-hydroxyphenyl) propionate], and other additives. These additives may be added during or after the preparation of the partially crosslinked thermoplastic elastomer (B).

By the term "partially crosslinked" used herein is meant that the product is crosslinked to such an extent that it still retain thermoplastic and elastomeric properties.

As the ethylene/alpha-olefin copolymer rubber (C), use the ethylene/alpha-olefin copolymer rubber (a) used in the preparation of the partially crosslinked thermoplastic elastomer (B). In a particular polymer composition according to the invention, the rubbers (a) and (C) may be the same or different.

The polymer composition according to he invention comprises from 50 to 85 parts by weight, preferably from 50 to 75 parts by weight of the ethylene-type ionomer resin (A), from 10 to 39 parts by weight, preferably from 20 to 35 parts by weight of the partially crosslinked olefin-type thermoplastic elastomer (B) and from 1 to 15 parts by weight, preferably from 5 to 15 parts by weight of the ethylene/alpha-olefin copolymer rubber (C). If the content of (A) is excessively high, it is difficult to appreciably reduce surface gloss, and flexibility tends to become poor, whereas if the content of (A) is unduly low, scratch resistance and adhesion to metals tend to decrease. If the content of (B) is excessively high, it is difficult to appreciable reduce in surface gloss and scratch resistance tends to become poor, whereas if the content of (B) is unduly low, appreciable improvement in flexibility and reduction of surface gloss is not realized. If the content of (C) exceeds the above-prescribed range, resistance to heat deformation and scratch resistance tend to decrease, whereas if the content of (C) is unduly low, a mineral oil softener, if any, tends to bleed out and surface gloss is not appreciably reduced.

The polymer composition according to the invention preferably has a melt flow rate (MFR) of from 0.1 to 50 g/10 min., in particular from 0.1 to 10 g/10 min., as measured at a temperature of 190 ° C. and under a load of 2160 g.

The polymer composition according to the invention is prepared by dry or melt blending simultaneously or sequentially suitable amounts of the ethylen-type ionomer resin (A), partially crosslinked olefin-type thermoplastic elastomer (B) and ethylene/alpha-olefin copolymer rubber (C). The dry blending may be carried out using various blenders such as a Henschel mixer, tumbling mixer and ribbon blender, while the melt blending may be carried out using various mixers such as a single screw extruder, twin-screw extruder and Bumbury's mixer, a roll mill, and various kneaders. The order of the components to be blended is not particularly limited.

To the polymer composition according to the invention there may be added various fillers such as carbon black, clay, talc, calcium carbonate, calcium bicarbonate, kaolin, diatomaceous earth, silica, alumina, asbestos, graphite, wisker, metal powder, glass beads, glass fibers and carbon fibers, coloring agents such as titanium oxide, zinc flower, red iron oxide, ultramarine, prussian blue, azo pigments, lake pigments and phthalocyanine pigments, and other additives, or example, antioxidants, plasticizers, heat stabilizers, weathering stabilizers, antistatic agents, lubricants such as metal soaps and waxes, and flame retardants, in such amounts that the additives may not adversely affect desired properties of the composition.

As already stated, the fillers, coloring agent and other additives may be added during the stage of preparing the partially crosslinked olefin-type thermoplastic elastomer (B), or during the stage of blending to prepare the polymer composition according to the invention. Further, a foaming agent may be added to the composition according to the invention for a purpose of producing foamed shaped articles.

EFFECT OF THE INVENTION

The polymer composition according to the invention has excellent moldability and is capable of being molded into shaped articles which are excellent in scratch resistance, adhesion to metals, resistance to heat deformation and flexibility, antibleeding property of mineral oil softener contained and low surface gloss. Accordingly, the polymer compositions according to the invention are particularly useful in molding various articles including automotive parts such as bumper moldings, materials for interior finish of ceiling and doors, and instrument panels; bicycle parts, sports goods, construction materials, electric parts, housings and daily necessaries such as bags; and decorations. These articles can be prepared by various molding processes, including injection, extrusion, blow and compression molding processes.

EXAMPLES

The invention will now be further described by the following examples.

Component materials used in the examples are as follows.

Ionomer (1):

comprising 96 mol % of ethylene, 1 mol % of methacrylic acid and 3 mol % of zinc methacrylate, and having MFR of 1 g/10 min., as measured at 190 ° C. and under a load of 2160 g.

Ionomer (2):

comprising 95 mol % of ethylene, 3 mol % of methacrylic acid and 2 mol % of zinc methacrylate, and having MFR of 1.5 g/10 min., as measured at 190 ° C. under a load of 2160 g.

Ionomer (3):

comprising 96 mol % of ethylene, 3 mol % of methacrylic acid and 1 mol % of zinc methacrylate, and having MFR of 5 g/10 min., as measured at 190 ° C. and under a load of 2160 g.

Ionomer (4):

comprising 96 mol % of ethylene, 2 mol % of methacrylic acid and 2 mol % of sodium methacrylate, and having MFR of 1.0 g/10 min., as measured at 190 ° C. and under a load of 2160 g.

Thermoplastic elastomer (5):

"Milastomer" ® 8030B, a partially crosslinked olefin-type thermoplastic elastomer, supplied by MITSUI Petrochemical Industries Ltd., having MFR of 10 g/10 min., as measured at 230 ° C. and under a load of 10 kg, and a Shore hardness of (A)85.

Thermoplastic elastomer (6):

"Milastomer" ® 8032B, a partially crosslinked olefin-type thermoplastic elastomer, supplied by MITSUI Petrochemical Industries Ltd., having MFR of 15 g/10 min., as measured at 230 ° C. and under a load of 10 kg, and a Shore hardness of (A)80.

Copolymer rubber (7):

EPT 3092P, an ethylene/propylene/ ethylidenenorbornene terpolymer rubber, supplied by MITSUI Petrochemical Industries Ltd.

Copolymer rubber (8):

an ethylene/1-butene copolymer rubber having an ethylene content of 85 mol %, MFR of 4 g/10 min., as measured at 190 ° C., under a load of 2180 g, and a crystallinity index of 17%.

EXAMPLES 1 TO 4 AND COMPARATIVE EXAMPLES 1 TO 4

A mixture of the ionomer (1), partially crosslinked thermoplastic elastomer (5) and ethylene/alpha-olefin copolymer rubber (7) in amounts indicated in Table 1 was supplied to a single screw extruder having a diameter of 40 mm, where the mixture was melt blended under conditions of a die temperature of 200 ° C. and a screw rotation of 40 rpm, and pelletized. Properties of the pellets were evaluated in the manner as noted below.

The results are shown in Table 1.

Gloss

Using a single screw extruder having a diameter of 30 mm, the pellets were extruded to a ribbon having a width of 15 mm and a thickness of 0,55 mm. Surface gloss of the ribbon was visually examined. Low, intermediate and high gloss surfaces were rated as A, B and C, respectively.

Taper abrasion index

The pellets were heat pressed at a temperature of 160° C., to a sheet having a thickness of 3 mm. The sheet was tested for Taper abrasion index in accordance with ASTM D 1175 (in mg /1000 rotations using a CS-17 abrasion ring).

Bending modulus

The pellets were heat pressed at a temperature of 160° C., to a sheet having a thickness of 3 mm. The sheet was tested for bending modulus in accordance with ASTM D 747.

Gravity drawdown

The pellets were heat pressed at a temperature of 160° C., to a sheet having a length of 100 mm, a width of 200 mm and a thickness of 3 mm. The sheet was horizontally held along one 20 mm side with the other sides free. The assembly so constructed was placed in an oven maintained at a temperature of 90° C., for a period of 3 hours. At the end of the period a drawdown of the other 20 mm side of the sheet in mm was measured. The gravity drawdown (mm) can be a measure of heat resistance.

Bleed resistance

The pellets were heat pressed at a temperature of 160° C., to a sheet having a thickness of 3 mm. The sheet was placed in an oven at a temperature of 50° C., for a period of 2 weeks. At the end of the period, the surface of the sheet was visually observed as to yes or no of bleedout of a mineral oil softener. Ratings A, C and B were given to surface where no bleedout was observed, surface where bleedout was observed and surface that was intermediate.

EXAMPLE 5

Example 1 was repeated except that the ionomer (2) was used instead of the ionomer (1).
The results are shown in Table 1.

EXAMPLE 6

Example 1 was repeated except that the ionomer (3) was used instead of the ionomer (1).
The results are shown in Table 1.

EXAMPLE 7

Example 1 was repeated except that the ionomer (4) was used instead of the ionomer (1).
The results are shown in Table 1.

EXAMPLE 8

Example 1 was repeated except that the partially crosslinked thermoplastic elastomer (6) was used instead of the partially crosslinked thermoplastic elastomer (5).
The results are shown in Table 1.

EXAMPLE 9

Example 1 was repeated except that the ethylene/alphaolefin copolymer rubber (8) was used instead of the ethylene/alpha-olefin copolymer rubber (7).
The results are shown in Table 1.

I claim:

TABLE 1

| | Ex. 1 | Ex. 2 | Ex. 3 | Comp. Ex. 1 | Comp. Ex. 2 | Ex. 4 | Comp. Ex. 3 | Comp. Ex. 4 | Ex. 5 | Ex. 6 | Ex. 7 | Ex. 8 | Ex. 9 |
|---|---|---|---|---|---|---|---|---|---|---|---|---|---|
| COMPOSITION | | | | | | | | | | | | | |
| Ionomer (1) | 60 | 65 | 55 | 70 | 45 | 70 | 45 | 85 | | | | 60 | 60 |
| Ionomer (2) | | | | | | | | | 60 | | | | |
| Ionomer (3) | | | | | | | | | | 60 | | | |
| Ionomer (4) | | | | | | | | | | | 60 | | |
| Thermoplastic elastomer(5) | 30 | 30 | 30 | 30 | 30 | 20 | 45 | 5 | 30 | 30 | 30 | | 30 |
| Thermoplastic elastomer(6) | | | | | | | | | | | | 30 | |
| Copolymer rubber(7) | 10 | 5 | 15 | | 25 | 10 | 10 | 10 | 10 | 10 | 10 | 10 | |
| Copolymer rubber(8) | | | | | | | | | | | | | 10 |
| EVALUATION | | | | | | | | | | | | | |
| Gloss | A | A-B | A | C | A | A | A | C | A | A | A-B | A | A-B |
| Bleed resistance | A | A-B | A | C | A | A | A | A | A | A | A | A | A |
| Taper abrasion index (mg) | 45 | 37 | 53 | 32 | 82 | 29 | 81 | 22 | 47 | 52 | 40 | 47 | 42 |
| Bending modulus (HPa) | 100 | 110 | 95 | 103 | 80 | 125 | 73 | 132 | 92 | 85 | 88 | 92 | 90 |
| Gravity drawdown (nm) | 10 | 11 | 8 | 10 | 8 | 13 | 8 | 14 | 8 | 6 | 10 | 11 | 12 |

1. A polymer composition which comprises from 50 to 85 parts by weight of an ethylene-type ionomer resin (A) comprising ethylene and unsaturated carboxylic acid in which the carboxyl groups are partially neutralized from 10 to 39 parts by weight of a partially crosslinked olefin-type thermoplastic elastomer (B) comprising a partially cross-linked ethylene α-olefin copolymer rubber and a polyolefin resin and from 1 to 15 parts by weight of an ethylene/alpha-olefine copolymer rubber (C).

2. The polymer composition according to claim 1 wherein said ethylene-type ionomer resin comprises from 75 to 99.5 mol % of ethylene units, from 0.5 to 15 mol % of alpha, beta-unsaturated carboxylic acid units and from 0 to 10 mol % of alpha, beta-unsaturated carboxylic acid ester units, and from 5 to 90% of the carboxyl groups of the ionomer resin being neutralized by metallic ions having a valency of 1, 2 or 3.

3. The polymer composition according to claim 1 wherein said partially crosslinked olefin-type thermoplastic elastomer (B) comprises:

from 100 to 30 parts by weight of a partially crosslinked rubber composition obtained by dynamic heat treatment of a mixture comprising:
  (a) from 20 to 95 parts by weight of an ethylene/alpha-olefin copolymer rubber,
  (b) from 5 to 80 parts by weight of a polyolefin resin, the total weight of the (a) +(b) being 100 parts by weight, and from 5 to 80 parts by weight of components selected from
  (c) peroxide-noncrosslinkable hydrocarbon rubbers and
  (d) mineral oil softeners in the presence of a crosslinking agent, and
from 0 to 70 parts by weight of a polyolefin resin,
the total weight of (b) and [II]in the elastomer (B) being from 5 to 80 parts by weight based on 100 parts by weight of the elastomer (B).

4. The polymer composition according to claim 1 wherein the alpha-olefin component of said ethylene/alpha-olefin copolymer rubber (C) is propylene or 1-butene.

* * * * *

UNITED STATES PATENT AND TRADEMARK OFFICE
CERTIFICATE OF CORRECTION

PATENT NO. : 4,965,319

DATED : October 23, 1990

INVENTOR(S) : Manabu KAWAMOTO

It is certified that error appears in the above-identified patent and that said Letters Patent is hereby corrected as shown below:

Column 2, line 11, change "beta-unsaturated unsaturated" to -- beta-unsaturated --.

Column 4, line 57, change "0.940 g/cm:" to -- 0.940 g/cm$^3$ --.

Column 4, line 67, change "70 by mole" to -- 70 % by mole --.

Column 6, line 56, change "he invention" to -- the invention --.

Column 8, line 54, change "2180 g" to -- 2160 g --.

Column 10, lines 58-59, change "neutralized from" to -- neutralized, from --.

Signed and Sealed this

Fourth Day of August, 1992

Attest:

DOUGLAS B. COMER

*Attesting Officer*     *Acting Commissioner of Patents and Trademarks*